United States Patent
Leis et al.

(10) Patent No.: US 9,229,902 B1
(45) Date of Patent: Jan. 5, 2016

(54) MANAGING UPDATE DEPLOYMENT

(71) Applicant: Amazon Technologies, Inc., Reno, NV (US)

(72) Inventors: Benjamin Alan Leis, Seattle, WA (US); Gang Li, Bellevue, WA (US); Nathan Bartholomew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 13/767,714

(22) Filed: Feb. 14, 2013

(51) Int. Cl.
*H04L 12/24* (2006.01)
*G06F 15/177* (2006.01)

(52) U.S. Cl.
CPC ............ *G06F 15/177* (2013.01); *H04L 41/082* (2013.01)

(58) Field of Classification Search
USPC .......................................................... 709/221
See application file for complete search history.

(56) References Cited

U.S. PATENT DOCUMENTS

| | | | |
|---|---|---|---|
| 7,657,887 B2 * | 2/2010 | Kothandaraman et al. ... | 717/176 |
| 8,601,170 B1 * | 12/2013 | Marr et al. ................... | 717/168 |
| 8,869,135 B1 * | 10/2014 | Fitzgerald et al. ............ | 717/173 |
| 2007/0226679 A1 * | 9/2007 | Jayamohan et al. .......... | 717/101 |
| 2009/0150878 A1 * | 6/2009 | Pathak et al. ................. | 717/172 |
| 2010/0049857 A1 * | 2/2010 | Libert ........................... | 709/228 |
| 2011/0296390 A1 * | 12/2011 | Vidal et al. ................... | 717/168 |
| 2012/0137278 A1 * | 5/2012 | Draper et al. ................. | 717/170 |
| 2012/0203536 A1 * | 8/2012 | Gangemi et al. ............... | 703/22 |
| 2013/0080761 A1 * | 3/2013 | Garrett et al. ................ | 713/100 |
| 2014/0013315 A1 * | 1/2014 | Genevski et al. ............. | 717/170 |
| 2014/0053144 A1 * | 2/2014 | Jose et al. ..................... | 717/168 |

* cited by examiner

*Primary Examiner* — Larry Donaghue
(74) *Attorney, Agent, or Firm* — Knobbe, Martens, Olson & Bear, LLP

(57) ABSTRACT

Systems and methods for managing deployment of an update to computing devices, and for diagnosing issues with such deployment, are provided. An update deployment manager determines one or more initial computing devices to receive and execute an update. The update deployment manager further monitors a set of performance metrics with respect to the initial computing devices or a collection of computing devices. If a deployment issue is detected based on the monitored metrics, the update deployment manager may attempt to diagnosis the deployment issue. For example, the update deployment manager may determine that a specific characteristic of computing devices is associated with the deployment issue. Thereafter, the update deployment manager may modify future deployment based on the diagnosis (e.g., to exclude computing devices likely to experience the deployment issue).

25 Claims, 6 Drawing Sheets

MONITORING TABLE FOR UPDATE 300

| DEVICE | TEST RESULT | CPU MODEL | FIRMWARE | KERNEL | LOCATION |
|---|---|---|---|---|---|
| DEV 1 | FAILURE | BRAND A MODEL 3 | VERSION 1.0 | 3.4A | NA |
| DEV 2 | FAILURE | BRAND B MODEL 1 | VERSION 1.0 | 3.5 | EU |
| DEV 3 | SUCCESS | BRAND A MODEL 3 | VERSION 1.1 | 3.4A | EU |
| DEV 4 | FAILURE | BRAND A MODEL 2 | VERSION 1.0 | 3.4A | NA |
| DEV 5 | FAILURE | BRAND A MODEL 2 | VERSION 1.0 | 3.4A | ASIA |
| DEV 6 | SUCCESS | BRAND A MODEL 2 | VERSION 1.3 | 3.4A | ASIA |

*Fig.3.*

MANAGING UPDATE DEPLOYMENT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, individual computing devices within a data center may be configured to provide specific functionality according to the requirements of the data center. For example, various computing devices may be associated with different operating systems or operating system configurations to enable a computing device to provide different desired functionalities, or to provide similar functionalities more efficiently. Moreover, virtualization technologies may allow a single physical computing device to host one or more instances of a virtual machine (e.g., a virtual computing device), which virtual computing device instance appears to a user of a data center as an independent computing device. With virtualization, the host computing device can create, maintain, delete, or otherwise manage virtual computing device instances in a dynamic manner. In turn, users can request computing resources from the data center, including single computing devices or a configuration of networked computing devices, and be provided with virtual computing device instances that provide the requested computing resources.

An individual computing device or instance of a virtual computing device may be configured to provide specific functionality. For example, a computing device (e.g., physical or virtual) may be associated with different combinations of software applications and operating systems or operating system configurations to enable the computing device to provide different desired functionalities, or to provide similar functionalities more efficiently. Software and software configurations (e.g., operating systems, applications, drivers, modules, etc., and configurations thereof) are often contained within updates or update packages which a computing device may execute in order to implement a desired specific functionality corresponding to the contents of the update.

Due to various configurations of computing devices (e.g., physical or virtual), updates may cause differing effects across computing devices. For example, in some instances, updates may be associated with unintended consequences such as increased processing power utilization, decreased response time or failures. These unintended consequences may result from errors within the update, errors within the computing device, incompatibilities between the update and computing device, etc. In other instances, updates may fail to be implemented by a computing device, or may result in errors. The failure of updates to be implemented, or the causing of negative consequences by implementation of an update, may negatively impact the ability of the computing device to provide desired services.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 3 is a graphical illustration or visualization of diagnostic information generated based on monitoring performance metrics within computing devices after deployment of an update;

DETAILED DESCRIPTION

Figure 1:
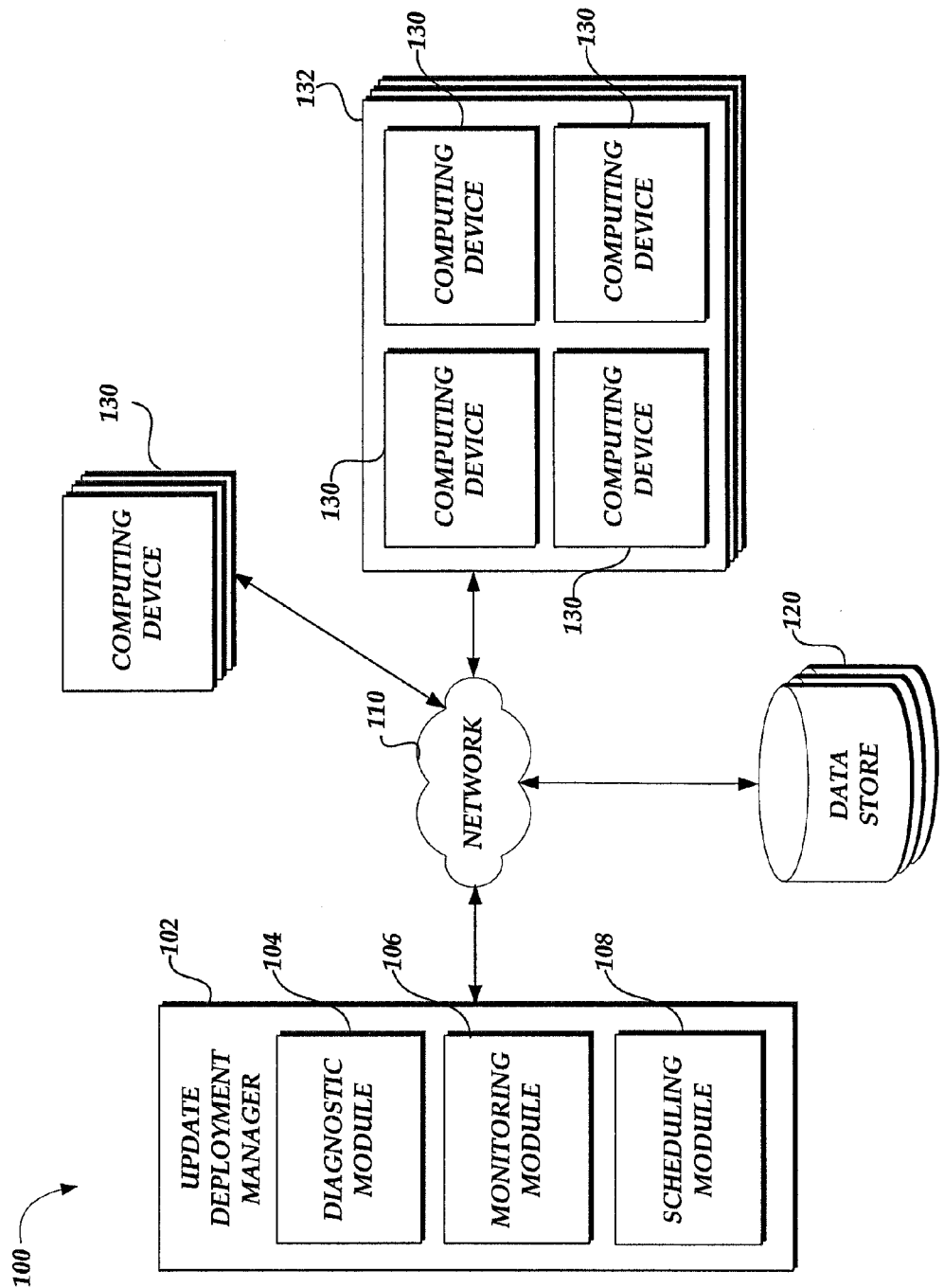
FIG. 1 is a block diagram depicting an illustrative environment for managing update deployment to a multiple computing devices and diagnosing deployment issues, wherein the environment includes a number of computing devices, a number of collections of computing devices, and an update deployment manager.

Generally described, aspects of the present disclosure relate to the deployment of software updates or update packages to computing devices, and management thereof. Specifically, systems and methods are disclosed which facilitate deployment of an update, diagnosis of deployment issues (e.g., unexpected or potentially undesirable effects of deployment), and modification of the deployment of based on a diagnosis (e.g., to attempt to mitigate deployment issues). An update may generally refer to any item or collection of items that may be installed, executed or implemented by a computing device (e.g., a user computing device, a server computing device, a virtual computing device, a networking device, or any other computing device). For example, an update or update package may include an operating system, an application, a driver, a module and configurations thereof. Moreover, an update may include commands, collections of commands, scripts, etc., which may be implemented by a computing device.

In an illustrative embodiment, an update deployment manager may deploy an update to an initial set of computing devices, while concurrently monitoring for potential effects of deploying the update. In some embodiments, the update deployment manager may monitor the set of computing devices themselves (e.g., to ascertain direct effects of deploying the update). In other embodiments, the update deployment manager may monitor alternative computing devices which may be affected by deployment of the update. For example, an update deployed to a back-end or non-user facing computing device may affect performance of a front-end or user facing computing device. As such, in order to deploy the update to an initial set of computing devices, the update deployment manager may issue an update deployment command to an initial set of computing devices. Thereafter, the computing devices in the initial set may receive and implement the update. During or subsequent to implementation of the update, the update deployment manager may receive monitoring information from a set of monitored computing devices (which may correspond to the initial set of computing devices implementing the update or to alternative monitored computing devices). Monitoring information may include any of a number of performance metrics of the operation of a computing device, such as latency, communication failure rate, available or used processing power, etc., as will be described in more detail below.

The update deployment manager may analyze the received monitoring information in order to determine whether one or more deployment issues have been detected. Deployment issues, as used herein, may generally describe any set of undesirable, unanticipated or unplanned effects or events occurring after deployment of an update. For example, deployment issues may include, but are not limited to, increased utilization of resources by a computing device (e.g., processing power, memory usage, network usage, etc.), increased unavailability of a computing device (e.g., latency, down time, failure, etc.), or failure of a computing device to meet service level agreements. As a further example, a deployment issue may correspond to a lack of an expected level of improvement in one or more performance metrics, even where some improvement in such metrics is realized. Accordingly, deployment issues may include any response or effect of deployment of an update which does not correlate to an expected response or effect. In some embodiments, the update deployment manager (or other device) may employ vitality tests to determine whether a deployment issue exists. For example, a vitality test may specify thresholds for one or more performance metrics, such that if a computing device does not meet a given threshold, a deployment issue is determined to exist. One skilled in the art will appreciate that vitality tests may include any number of mechanisms for determining whether a deployment issue exists with respect to monitored performance metrics.

In response to the detection of a deployment issue (or detection of a potential deployment issue), the update deployment manager may attempt to diagnose the deployment issue. For example, the update deployment manager may gather data from all or a subset of computing devices that have implemented the update, and attempt to determine correlations between those computing device which are experiencing deployment issues (e.g., failure of a vitality test) and those which are not. For example, the update deployment manager may determine that all computing devices with a specific configuration are experiencing deployment issues, while other computing devices are not. As will be discussed below, a number of heuristic algorithms may be utilized to diagnose potential causes of a deployment issue.

In the instance that a deployment issue is successfully diagnosed (e.g., a correlation between a deployment issue and other factors is determined within an acceptable level of certainty, whether or not the diagnosis is accurate), the update deployment manager may modify future deployment of an update based on the diagnosis. For example, if computing devices with a specific configuration experience deployment issues, the update deployment manager may modify a deployment schedule to exclude computing devices with the specific configuration. Such modification may reduce the deployment issues detected during continued deployment. The update deployment manager may further issue a notification to an administrator or operator advising of the deployment issue and the diagnosis. Thereafter, the update deployment manager may continue to deploy the update according to the modified schedule, and continue to monitor for deployment issues, until the update has been deployed to all desired computing devices.

In the instance that a diagnosis regarding a deployment issue cannot be accurately determined, the update deployment manager may attempt to gather more information in order to conduct further diagnosis. For example, the update deployment manager may select one or more additional computing devices on which to deploy the update and test for additional deployment issues. In some embodiments, additional computing devices may be determined based on a current deployment schedule. In other embodiments, additional computing devices may be determined based on an expected result of deployment (e.g., expected occurrence or non-occurrence of a deployment issue within the additional computing devices). In still more embodiments, additional computing devices may be determined based on a risk associated with deployment of the update to the additional computing devices (e.g., based on the likelihood of a deployment issue as well as the potential impact of the deployment issue).

Based on additional monitoring information gathered from the additional computing devices, the update deployment manager may reattempt to diagnose the deployment issue. For example, the additional monitoring information may enable to update deployment manager to determine the specific configuration or aspect of computing devices which causes a deployment issue. In the instance that a deployment issue is not successfully diagnosed, the update deployment manager may continue to select additional devices to receive the update, to gather monitoring information of those computing devices, and to reattempt to diagnose the cause of the deployment issue. The update deployment manager may continue until a diagnosis is reached or other ending criteria are satisfied (e.g., an inability to diagnose the issue). In the instance that a successful diagnosis is reached, the update deployment manager may deploy the update according to a modified deployment schedule, as described above, until completion of update deployment.

In some embodiments, monitored performance metrics (during either standard deployment or diagnosis of a deployment issue) may be customized based on the update to be deployed. For example, where an update includes an update to a database application, performance metrics may include response time of queries to the database and a number of unsuccessful (e.g., dropped) queries to the database after deployment of the update. Moreover, in some embodiments, performance metrics may be monitored on additional applications or services. For example, a database for which an update is to be deployed may facilitate the operation of a web server. As such, performance metrics may include the performance of the web server (e.g., latency, timed out requests, etc.). As such, performance metrics may be selected to include "real-world" results of a deployment.

Further, monitored performance metrics may be based in part on a potential diagnostic of a deployment issue. For example, where a deployment issue is detected related to a specific performance metrics, additional similar performance metrics may be monitored, or current performance metrics may be monitored more closely. For example, where a deployment issue corresponds to an unusual increase in central processing unit (CPU) utilization, monitored performance metrics may be modified to include random access memory (RAM) utilization, power consumption, graphical processing unit (GPU) utilization, or other metrics potentially related to CPU utilization. Examples of monitored performance metrics may include, but are not limited to CPU utilization, RAM utilization, power consumption, persistent data store utilization, network bandwidth utilization, or any additional performance metrics targeted to the operation of the computing device. In some embodiments, performance metrics may be selected based on requirements for operation of a computing device or an application. For example, performance metrics may be selected based on service level agreements (SLAs) corresponding to a computing device or an application. In some embodiments, performance metrics affected by an update deployment may not be immediately obvious. For example, the ramifications of deployment of an update affecting a low level management application (e.g., a hypervisor) may not be immediately known. As such, performance metrics may include a wide selection of applications or computing devices, whether or not such applications or computing devices are known to potentially be effected by an update deployment.

Specific embodiments and example applications of the present disclosure will now be described with reference to the drawings. These embodiments and example applications are intended to illustrate, and not limit, the present disclosure.

FIG. 1 is a block diagram depicting an illustrative environment 100 for managing deployment of updates to computing devices and diagnosis deployment issues related to the update. The illustrated environment includes a number of computing devices 130. In the illustrated environment, some computing devices 130 are arranged into collections of computing devices 132. Illustratively, a collection of computing devices 132 may correspond to multiple physical computing devices arranged within a shared housing. In other embodiments, a collection of computing devices 132 may correspond to multiple virtual computing devices, such as virtual machine instances, which share a single physical computing device. In still more embodiments, a collection of computing devices 132 may correspond to a number of computing devices 130 in a given geographic region (e.g., a room, building, city, state, or continent). As will be appreciated by one skilled in the art, a collection of computing devices 132 may correspond to collections of physical computing devices, virtual computing devices or combinations of the two. Each computing device 130 may be configured to receive an implement a number of updates (e.g., including applications, operating systems, modules, drivers, configurations or any combination thereof).

The illustrative environment further includes a number of data stores 120. Generally, a data store 120 may correspond to a hard disk drive, network accessible storage, or any other type of perpetual or substantially perpetual storage accessible by one or more of the computing devices 130. For example, the data stores 120 of FIG. 1 may correspond to network accessible storage device. Though depicted as external to computing device 130, in some embodiments, data stores 120 may be internal to a computing device 130.

The illustrated environment further includes a network 110 operable to enable communication between the computing devices 130 (either alone or in a collection 132), the data stores 120, and an update deployment manager 102. The network 110 may be, for instance, a wide area network (WAN), a local area network (LAN), or a global communications network.

Illustratively, the update deployment manager 102 may manage deployment of updates to one or more computing devices 130. Specifically, the update deployment manager 102 may include a monitoring module 106 to monitor a set of performance metrics prior to, during or subsequent to deployment of an update. As will be described below, the monitoring module may further be configured to detect deployment issues based on the monitored performance metrics. The update deployment manager 102 may further include a diagnostic module configured to diagnose potential causes of detected deployment issues, such as specific configurations or characteristics of computing devices 130 experiencing deployment issues. As will be described in more detail below, the update deployment manager 102 may employ heuristic algorithms in order to diagnosis deployment issues. Still further, the update deployment manager 102 may include a deployment modification module 108 configured or operable to modify deployment of the update based on a diagnosed deployment issue. For example, the deployment modification module 108 may be configured to modify a deployment schedule to exclude devices expected to experience deployment issues.

As an illustrative example, an operator of the update deployment environment 100 may desire that a given update be deployed and implemented on each of the computing devices 130. As such, the update deployment manager 102 may select an initial set of computing devices 130 to receive the update. Moreover, the update deployment manager 102 may select a set of performance metrics to monitor in conjunction with deployment. In some embodiments, an initial set of computing devices 130 and monitored performance metrics may be manually selected (e.g., based on a selection of an operator of the update deployment manager 102). In other embodiments, either or both of the initial set of computing devices 130 or the monitored performance metrics may be selected automatically. Automatic selection of an initial set of computing devices 130 or performance metrics may be based, by way of non-limiting example, on the update, the configuration of a computing device 130, service level agreements or a combination thereof.

Thereafter, the update may be distributed to the selected initial computing devices 130. During or after implementation of the update by each of the initial computing devices 130, the update deployment manager 102 (e.g., via the monitoring module 106) may monitor the initial set of computing devices 130 and any additional computing devices 130 based on the selected performance metrics. The update deployment manager 102 may further analyze the monitored performance metrics in order to detect deployment issues potentially caused by the deployment. As will be described below, in some embodiments, the update deployment manager 102 may utilize vitality tests in order to detect a deployment issue. For example, the update deployment manager 102 may determine that, within the initial set of computing devices 130, 25% of computing devices 130 experienced a deployment issue.

Subsequent to detection of a deployment issue, the update deployment manager 102 may attempt to diagnose a probable cause of the deployment issue (e.g., via the diagnostic module 104). Diagnosis may include analysis of the monitored performance metrics to determine correlations between those computing devices 130 experiencing deployment issues and those computing devices 130 not experiencing deployment issues. Diagnosis may further include deployment of the update to additional computing devices 130 in order to gather further performance information. For example, the diagnostic module 104 may utilize monitored performance metrics in order to determine that only computing devices 130 with a specific version of component firmware (e.g., a network device firmware) experience deployment issues. In some embodiments, these additional computing devices 130 may be selected based a specified set of criteria, such as risk assessment criteria for determining a potential impact of deploying the update to the additional computing devices. In other embodiments, specific additional computing devices 130 may be designated to receive potentially problematic updates. These designated computing devices 130 may, for example, be isolated from other computing devices. In some embodiments, designated computing devices 130 may include virtual computing devices (e.g., instantiated in response to a desire for additional computing devices 130 on which to deploy an update).

Thereafter, the update deploy manager 102 may modify future deployment of the update in order to mitigate the diagnosed deployment issue (e.g., via the scheduling module 108). Illustratively, where the diagnosis indicates that only computing devices 130 with a specific version of component firmware (e.g., a network device firmware) experience deployment issues, the update deploy manager 102 may modify a deployment schedule to exclude providing the update to computing devices 130 with the firmware version. The update deployment manager 102 may further notify an operator or administrator of the deployment environment 100 of the deployment issue and diagnosis (e.g., to facilitate correction of the deployment issue).

Thereafter, the update deployment manager 102 may continue to deploy the update to additional (non-excluded) computing devices 130, to monitor performance metrics across a number of computing devices 130, to diagnose deployment issues, and to modify deployment based on such diagnoses. Accordingly, an update deployment may continue without requiring a large amount of manual intervention, and while reducing the potential existence of deployment issues.

Though diagnostic module 104, the monitoring module 106 and scheduling module 108 are depicted in FIG. 1 to be included in the update deployment manager 102, in some embodiments, each computing device 130 may include any combination of diagnostic module 104, the monitoring module 106 and scheduling module 108. For example, a computing device 130 may include a monitoring module 106 configured to monitor performance metrics on the computing device 130 and report such metrics to the update deployment manager 102. Further, in some embodiments, a computing device 130 may include diagnostic module 104 and a scheduling module 108 configured to manage diagnosis of deployment issues and deployment of an update to the implementing computing device 130 or other computing devices 130. For example, diagnosis of deployment issues or deployment of an update may be facilitated by peer to peer communication, such that each computing device 130 implements an instance of diagnostic module 104 and a scheduling module 108 that are configured to diagnose deployment issues and schedule deployments of an update to one or more additional computing devices 130. In some such embodiments, the update deployment manager 102 may be omitted.

Figure 2A:
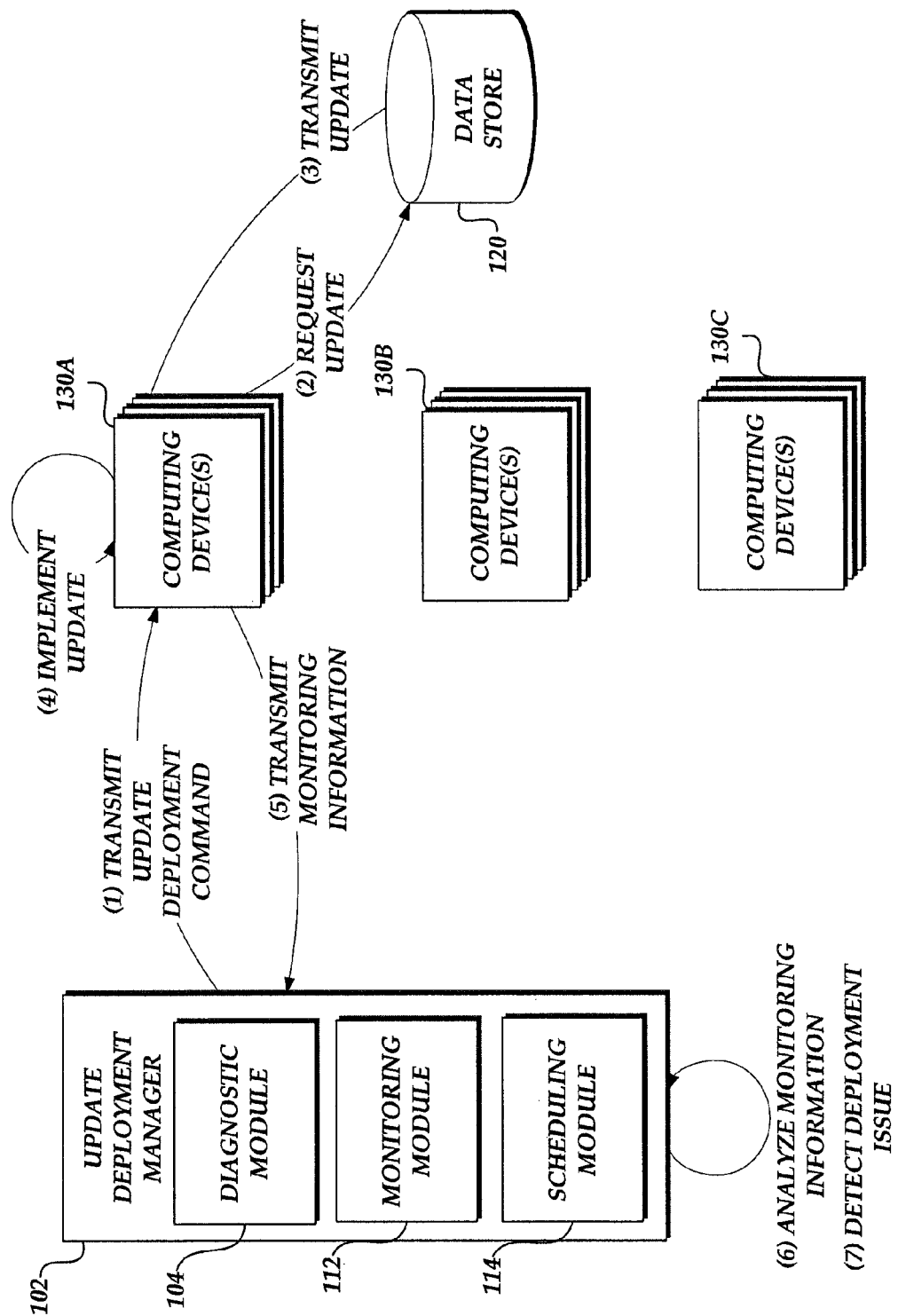
FIG. 2A is a block diagram of the update deployment management environment of FIG. 1 illustrating the deployment of an update to a set of computing devices, the monitoring of performance metrics of the computing devices, and the detection of a deployment issue.
Figure 2B:
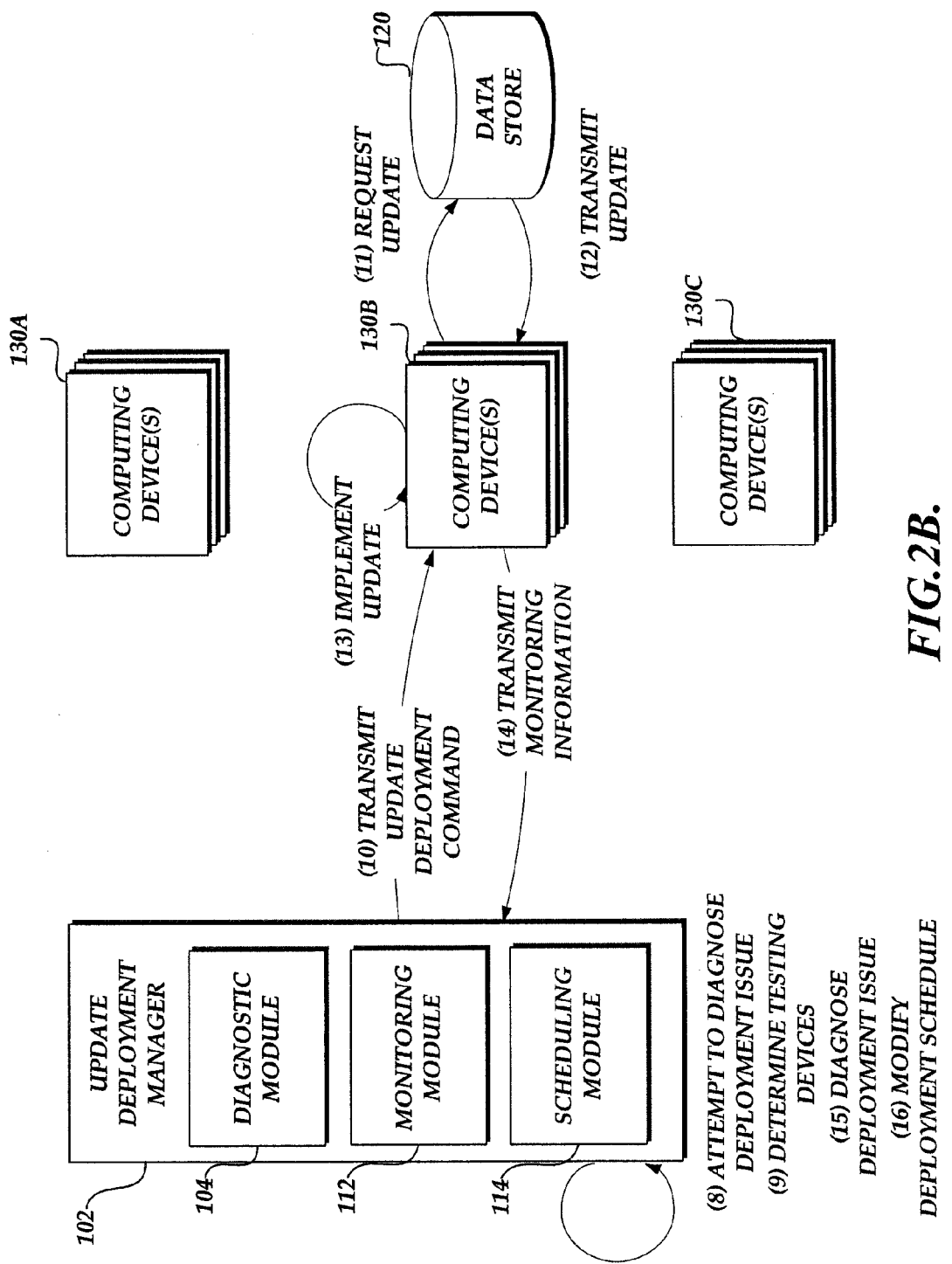
FIG. 2B is a block diagram of the update deployment management environment of FIG. 1 illustrating the diagnosis of the deployment issue, and modification of a deployment schedule according to the diagnosis.

With reference to FIGS. 2A and 2B, illustrative interactions for deployment of an update to a number of computing devices and diagnosis of a deployment issue in conjunction with the update will be described. Specifically, FIG. 2A depicts an illustrative interaction for deploying an update to an initial set of computing devices 130A, and detection of a deployment issue related to the update. FIG. 2B depicts one illustrative interaction for diagnosis of the deployment issue, including deployment of the update to an additional set of computing devices 130B, and modification of future deployment of the update in response to the diagnosis. Though the interactions of FIGS. 2A and 2B may occur independently, they are described herein as consecutive. As such, for clarity, the interactions of FIGS. 2A and 2B are numbered continuously.

As illustrated in FIG. 2A, an update deployment manager 102 may transmit an update deployment command to an initial set of computing devices 130A (such as one or more computing devices 130 of FIG. 1). In some embodiments, the set of computing devices 130A may be contained within a predefined collection of computing devices, such as computing device collections 132 of FIG. 1. In other embodiments, the set of computing devices 130A may include various individual computing devices 130, or computing devices 130 from different collections of computing devices 132. Selection of a set of initial computing devices will be described in more detail with respect to FIG. 4, below.

In response to a received update deployment command, the initial set of computing devices 130A may retrieve and implement the corresponding update. In some embodiments, an update may be retrieved from a data store 120, which may represent a networked data store. For example, as shown in FIG. 2A, each computing device 130A may transmit a request for the update reference in the update deployment command to a data store 120. Thereafter, the data store 120 may return the requested update to the computing device 130A. Though retrieval of an update is discussed herein with reference to an external data store, in some embodiments, an update may be alternatively retrieved. For example, in some embodiments, the update deployment manager may be operable to transmit the update to the computing device 130A (e.g., in conjunction with an update deployment command). In other embodiments, a computing device 130A may be configured or operable to store a number of updates, such as on a local data store. As such, retrieval of an update may be unnecessary.

After retrieving a relevant update, the set of computing devices 130A may implement the update. For example, where the update corresponds to executable software (e.g., an application or application installation file), the update may be implemented by executing the update. As a further example, where the update corresponds to a software image, the image may be loaded onto each computing device 130A. Still further, where the update corresponds to a module, configuration file, or other software, each computing device 130A may be otherwise modified to implement the update (e.g., by loading the module or configuration file, etc.).

Thereafter, the set of computing devices 130A may transmit monitoring information corresponding to a set of performance metrics to the update deployment manager 102. Though FIG. 2A depicts receiving monitoring information from the initial set of computing devices 130A, in some embodiments, monitoring information may be received from additional computing devices 130, such as the sets of computing devices 130B and 130C. Monitoring of additional computing devices may be beneficial in order to detect far removed deployment issues. For example, the operation of one or more computing devices 130B may depend, directly or indirectly, on one or more computing devices 130A. As such, one or more computing devices 130B may be affected by the deployment of an update on the computing devices 130B. Moreover, in some instances, the dependence of computing devices 130B on computing devices 130A may be complex, and based on interdependence of a number of additional devices. As such, it may not be immediately clear that such dependence exists. As such, computing devices 130 may be monitored regardless of a direct, known connection to the initial set of computing devices 130A.

After receiving monitoring information from a set of computing devices 130A, the update deployment manager 102 (e.g., via the deployment modification module 114) may analyze the received monitoring information in order to determine the existence of a deployment issue. Such analysis of performance metrics may include comparison of a performance metric against historical data regarding the metric. For example, the analyzed monitoring information may correspond to performance metrics received after implementing an update on a first computing device 130. Further, the update deployment manager 102 may have monitored the same performance metric prior to implementation of the update on the first computing device 130. As such, detection of a deployment issue may include determining whether a performance metric has changed in response to implementation of an update. For example, CPU utilization of the first computing device 130 may have been at 5% prior to implementation of an update. Subsequent to such implementation, CPU utilization of the first computing device 130 may have risen to 75%. Such analysis may be carried for any monitored performance metrics, as well as for any computing devices 130 reporting monitoring information. For example, a change in CPU utilization for one or more computing devices 130B and 130C may also be determined.

In some embodiments, detection of a deployment issue may correspond to one or more performance metrics satisfying a predefined threshold. For example, thresholds may be set such that if CPU usage rises above an average of 75% utilization during monitoring, a deployment issue may be assumed. In some embodiments, thresholds may be defined in absolute values (e.g., a specific percentage of utilization, a specific amount of RAM or network bandwidth used, a specific percentage of failed requests, etc.) In other embodiments, thresholds may be defined relative to historical monitoring data (e.g., CPU post-update is a given percentage higher than usage pre-update, etc.). Still further, in some embodiments, detection of a deployment issue may combine thresholds across a number of metrics. In some embodiments, performance metrics may be compared against a vitality test, which may define standards for whether the metrics implicate a deployment issue. For example, a vitality test may analyze the values of all metrics against a number of thresholds, and based on the aggregate result, report either that the update has succeeded (e.g., no deployment issue exists) or failed (e.g., a deployment issue may exist). One skilled in the art will appreciate that a vitality test may include any number of algorithms for analyzing performance metrics.

Though determination of deployment issues is described above with reference to the update deployment manager 102, in some embodiments computing devices 130 themselves may be configured to determine the existence of a deployment issue. For example, each computing device 130 may itself carry out a vitality test on a number of monitored performance metrics, and report the results of such testing to the update deployment manager 102.

In instances where analysis of the monitoring information does not reveal the existence of a deployment issue, the update deployment manager 102 may continue to deploy the update across computing devices 130. Such deployment may occur according to any number of deployment techniques or deployment schedules. For the purposes of the present description, it will be assumed that the update deployment manager 102 determines that a deployment issue is indicated by the received monitoring information.

With reference now to FIG. 2B, an illustrative interaction is depicted for facilitating diagnosis of a deployment issue, such as the deployment issue discussed above with respect to FIG. 2A. Specifically, after detection of a deployment issue, the update deployment manager 102 may attempt to diagnose the deployment issue based on previous received monitoring information (e.g., the monitoring information used to detect the deployment issue). For example, the update deployment manager 102 may attempt to diagnose the deployment issue based on monitoring information gathered from the set of computing devices 130A. As will be discussed in more detail below, diagnosis may include the detection of similarities or correlations between characteristics of computing devices 130 experiencing a deployment issue. For example, where each computing device 130 experiencing a deployment issue shares a specific set of characteristics (e.g., configuration, location, usage levels, etc.), the update deployment manager 102 may diagnose the set of characteristics as causing or corresponding to the deployment issue. However, in many instances, the difficulty of correlating characteristics to deployment issues may be inversely proportional to the amount of monitoring information available. For example, where thousands of computing devices 130 have implemented an update, and hundreds have experienced deployment issues with the update, it may be relatively simple to determine a set of characteristics correlated to the deployment issue. In contrast, where only a few computing devices 130 have implemented an update, and only a single computing device 130 has experienced a deployment issue, it may be difficult or impossible to correlate and specific characteristic with the deployment issue.

Accordingly, for the purposes of discussion with respect to FIG. 2B, it will be assumed that the update deployment manager is initially unable to accurately diagnose the deployment issue based on the previously received monitoring information. Accordingly, the update deployment manager 102 may attempt to gather additional monitoring information by deploying the update to an additional set of computing devices 130. In one embodiment, additional computing devices 130 may be selected based on a previously established deployment schedule. For example, the selected additional computing devices 130 may correspond to the next computing devices 130 that would have received the update had a deployment issue not been detected. In another embodiment, the additional computing devices 130 may be determined based at least in part on the previously received monitoring information or the previously attempted diagnosis. As will be described in more detail below, in some instances, the update deployment manager 102 may be unable to accurately diagnose a deployment issue, but may determine that certain characteristics of computing devices 130 make a deployment issue more likely to occur. Accordingly, the update deployment manager 102 may deploy the update on computing devices 130 considered more likely to experience the deployment issue, in order to confirm a partial diagnosis. In other embodiments, additional computing devices 130 to receive an update may be selected based on a risk associated with deploying the package to the additional computing devices 130. For example, additional computing devices 130 may be selected such that, if a deployment issue does occur on one or more of the additional computing devices 130, the effect on operations of the deployment environment 100 is minimized. In some such embodiments, a risk associated with deployment of an update to a computing device 130 may further include a probability that a deployment issue will occur after deployment of the update. For example, a risk may correspond to measure of potential severity of a deployment issue on a computing device 130 weighted according to the probability of the deployment issue occurring after deployment of an update to the computing device 130. In these embodiments, the update deployment manager 102 may select the lowest risk computing devices 130 as additional computing devices 130 to which to deploy an update.

For the purposes of FIG. 2B, it will be assumed that the update deployment manager 102 determines that the update should be deployed to the set of computing devices 130B. Accordingly, the update deployment manager 102 may transmit an update deployment command to the set of computing devices 130B. In response to the received update deployment command, the set of computing devices 130B may retrieve and implement the corresponding update. In some embodiments, an update may be retrieved from a data store 120, which may represent a networked data store. For example, as shown in FIG. 2B, each computing device 130B may transmit a request for the update reference in the update deployment command to a data store 120. Thereafter, the data store 120 may return the requested update to the computing device 130B. Though retrieval of an update is discussed herein with reference to an external data store, in some embodiments, an update may be alternatively retrieved. For example, in some embodiments, the update deployment manager may be operable to transmit the update to the computing device 130B (e.g., in conjunction with an update deployment command). In other embodiments, a computing device 130B may be configured or operable to store a number of updates, such as on a local data store. As such, retrieval of an update may be unnecessary. After retrieving a relevant update, the set of computing devices 130B may implement the update as described in more detail above with respect to FIG. 2A. Thereafter, the set of computing devices 130B may transmit monitoring information corresponding to a set of performance metrics to the update deployment manager 102. As noted above, in some embodiments, monitoring information may be received from additional computing devices 130, such as the sets of computing devices 130A and 130C.

After receiving additional monitoring information from the computing devices 130B, the update deployment manager 102 may again attempt to diagnose the deployment issue based on all monitoring information received from both computing devices 130A and 130B. Diagnosis of deployment issue will be discussed in more detail below with respect to FIGS. 3 and 5. However, in brief, the update deployment manager 102 may utilize the combined monitoring information from computing devices 130A and 130B in order to determine a correlation between those computing devices experiencing deployment issues and those not experiencing deployment issues. By identifying such a correlation, the update deployment manager 102 may be enabled to predict other computing devices 130 that may experience deployment issues. For example, where all or substantially all computing devices 130 that have previously experienced a deployment issue share a certain set of characteristics, the update deployment manager 102 may determine that other computing devices 130 with that set of characteristics are likely to experience deployment issues. As noted above, in some instances, the difficulty of determining a set of characteristics correlated to a deployment issue may be inversely proportional to the amount of monitoring information collected from computing devices 130 that have implemented the update. For the purposes of discussion of FIG. 2B, it will be assumed that the monitoring information received from computing devices 130A and 130B is sufficient to allow the update deployment manager 102 to diagnose the deployment issue. However, in other instances, the update deployment manager 102 may continue to deploy the update to additional computing devices 130 in order to gather additional monitoring information, as will be described in more detail with reference to FIG. 5, below.

After successful diagnosis of a deployment issue, the update deployment manager 102 may modify a schedule of deployment of the update, such that computing devices 130 likely to experience deployment issues are excluded. For example, if a deployment issue is correlated to computing devices 130 having a specific characteristic or set of characteristics, the update deployment manager 102 may remove such computing devices 130 from a deployment schedule, or refrain from transmitting update deployment commands to such computing devices 130. In this manner, the likelihood of future deployment issues may be reduced. In some embodiments, the update deployment manager may take further responsive action, such as generating an alert to an operator or administrator that a deployment issue has occurred and that it was successfully diagnosed. Thereafter, the update deployment manager 102 may continue to deploy the update normally, while monitoring for additional deployment issues, until deployment of the update is complete.

With reference to FIG. 3, diagnosis of deployment issues will be described in more detail with reference to the table 300, containing monitoring information received from a number of computing devices DEV1-DEV6. Each of the computing devices DEV1-DEV6 may correspond, for example, to a computing device 130 of FIG. 1. Example characteristics of each computing device DEV1-DEV6 is displayed in the table 300, including a CPU model of each computing device DEV1-DEV6, a firmware version of each computing device DEV1-DEV6 (e.g., a firmware of a given component of the computing device), a kernel version of an operating system of each computing device DEV1-DEV6, and a location of each computing device DEV1-DEV6. Though example characteristics are included in the table 300, one skilled in the art will appreciate that characteristics of the computing devices DEV1-DEV6 may include any aspect of the computing devices DEV1-DEV6, including but not limited to physical configuration, location, classification, or other statistical information (e.g., uptime, age, historical information, etc.). For example, characteristics may include a specific rack, room or data center in which a computing device is located or environmental information regarding the computing device (e.g., temperature or humidity of the computing device or surrounding environment). Characteristics of the computing devices DEV1-DEV6 may be received directly from the computing devices DEV1-DEV6, or from alternative sources (e.g., a database of device characteristics).

In addition, the table 300 includes a test result of each computing device DEV1-DEV6. In the illustrative example of FIG. 3, it is assumed that deployment of an update to each computing device DEV1-DEV6 may be designated as either a success or failure. Specifically, success may correspond to deployment of the update without experiencing a deployment issue. Failure may correspond to experiencing a deployment issue (e.g., the update failed to be implemented, or a performance metric of the computing device DEV1-DEV6 failed to satisfy a threshold). In some instances, success or failure of deployment may be determined based at least in part on a vitality test of the computing device DEV1-DEV6, as described above. Though description is made herein with reference to success or failure, in some embodiments, multiple types of deployment issues may be detected, each type corresponding to a differing result of deployment. For example, implementation of an update on a computing device may result in one of many error codes, each representing a distinct deployment issue. In these instances, each error code may be individually diagnosed.

As shown in the table 300, a number of computing devices DEV1-DEV6 experienced deployment issues during deployment of the update of FIG. 3. Specifically, computing devices DEV1, DEV2, DEV4 and DEV5 experienced deployment issues, while computing devices DEV3 and DEV6 did not experience deployment issues. A device, such as the update deployment manager 102 of FIG. 1, may utilize the characteristic information in table 300 in order to attempt to diagnose the experienced deployment issues. Specifically, diagnosis may correspond to detection of a correlation between one or more characteristics and the occurrence of a deployment issue. In one embodiment, a threshold confidence level of correlation may be required between a characteristic and occurrence of a deployment issue. For example, where over a given percentage of computing devices with a given characteristic (or set of characteristics) experience a deployment issue, that characteristic may be determined to be correlated to the deployment issue. Illustratively, if 95% of computing devices that experience a deployment issue share a common model of CPU, then the deployment issue may be diagnosed to correspond to the CPU model. By increasing the threshold confidence level, the number of falsely positive correlations may be reduced, but detection of a correlation may be more difficult; conversely, by decreasing the threshold confidence level, the number of false positives may be increased, but detection of a correlation may be easier. Such a threshold confidence level may therefore be set at a level desirable to an operator or administrator of a computing environment.

For example, in FIG. 3, among the four computing devices (DEV1, DEV2, DEV4 and DEV5) that experienced deployment issues (e.g., a failure of a vitality test), two computing devices (DEV4 and DEV5) shared a common CPU model. An update deployment manager 102 may therefore determine there is a 50% confidence level that the CPU model is a factor in experiencing the deployment issue. This confidence level may be modified by other factors, as discussed below. Similarly, of the four computing devices that experienced deployment issues, all four share a common firmware version, resulting in a (preliminary) 100% confidence level that the firmware version is correlated to the deployment issue. A correlation confidence may be similarly calculated for each remaining characteristic.

In some embodiments, a threshold confidence level may further be based on computing devices not experiencing a deployment issue. For example, where 100% of computing devices experiencing a deployment issue share a specific characteristic, but a large number of computing devices not experiencing a deployment issue also share the specific characteristic, it may be unlikely that a correlation between the characteristic and the deployment issue exists. Accordingly, in some embodiments, a correlation confidence level may be reduced by the percentage of computing devices with a given characteristic that are not experiencing a deployment issue.

For example, as discussed above, a preliminary confidence of correlation between CPU model and deployment issue may be calculated to be 50%, since two of four computing devices experiencing a deployment issue share the CPU model "Brand A, Model 2." However, of the two computing devices not experiencing a deployment issue (DEV3 and DEV6), one also shares the characteristic "Brand A, Model 2," resulting in a 50% false correlation confidence level. Accordingly, the initially calculated confidence level of 50% may be reduced by the false correlation level of 50%, resulting in no significant total expected correlation between CPU model and the deployment issue. As will be discussed below, both a correlation confidence level and a false correlation confidence level may be modified by additional statistical methods, which may alter the total expected correlation. Similarly, as noted above, an initial confidence level of correlation between a firmware version of "version 1.0" and the deployment issue may be calculated at 100%. Because no computing devices not experiencing a deployment issue contained the correlated firmware version, the false confidence level may be calculated at 0%, resulting in a total expected correlation of 100%. Total expected correlations for each remaining characteristic may be similarly calculated.

After determining a total expected correlation for each characteristic, a diagnosis may be determined. In some embodiments, a successful diagnosis may be reached where at least one characteristic has a total expected correlation above a given threshold value. For example, where at least one characteristic has a total expected correlation of above 95%, the deployment issue may be diagnosed as being correlated to that characteristic.

Though simplistic statistical methods for determining characteristics are described above, any statistical method for determining correlations may be utilized. For example, in one embodiment, either or both of the calculated initial confidence level and the calculated false confidence level may be modified based on an expected margin of error. Illustratively, the initially calculated confidence of correlation between firmware "version 1.0" and a deployment issue may be 100%, as noted above. However, because the sample size of four devices is small, the confidence may be associated with a large margin of error. This margin of error may reduce the initial correlation confidence level such that it is less than 100%. Calculation of margins of error and other potential statistical algorithms are well known in the art, and therefore will not be described in detail herein.

In addition, though information regarding only six computing devices is discussed above, diagnosis of a deployment issue may include statistical analysis of information regarding any number of computing devices. In general, larger sample sets of computing devices receiving a deployed update may significantly increase the likelihood of a correct diagnosis of a deployment issue.

Figure 4:
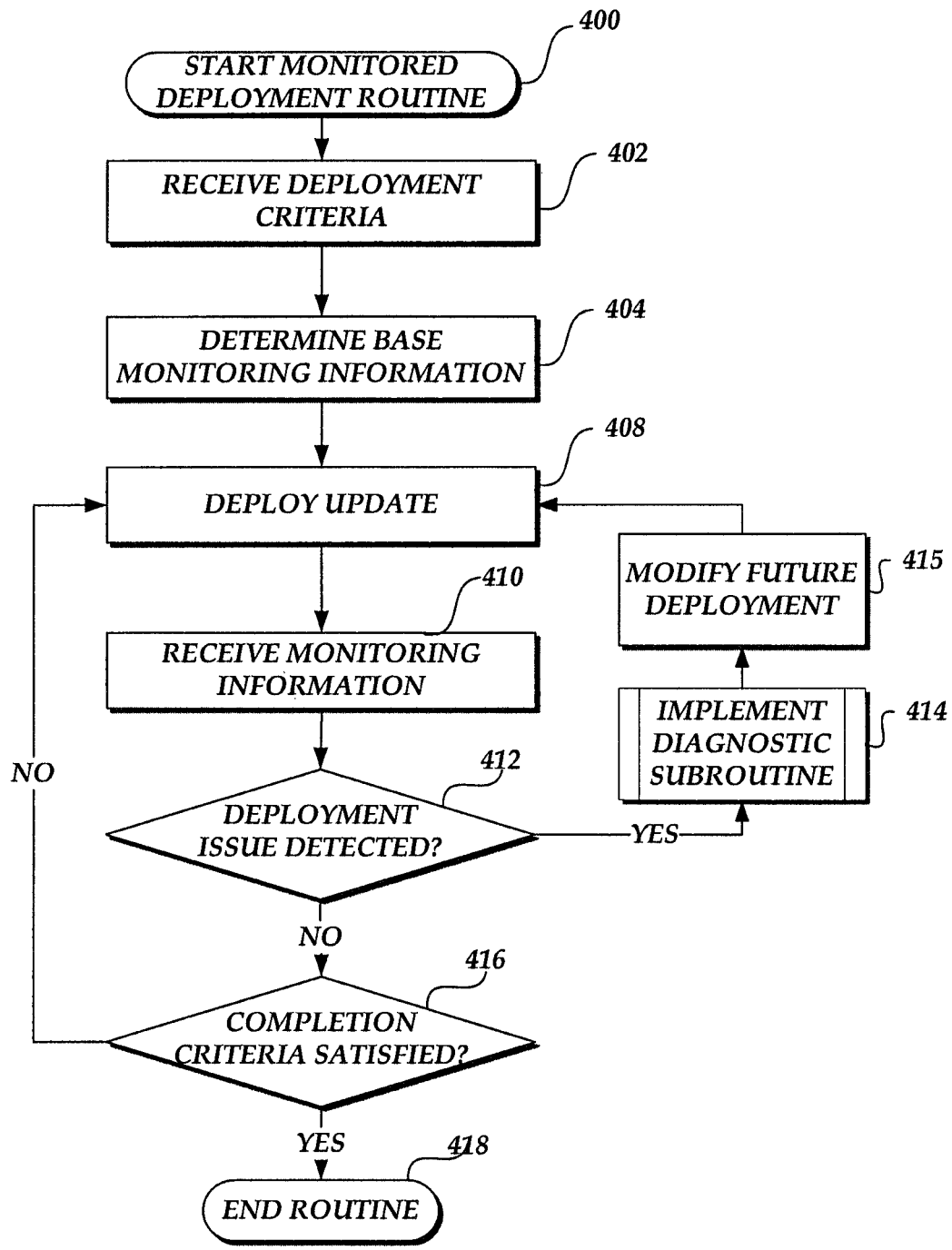
FIG. 4 is a flow diagram depicting an illustrative routine implemented by an update deployment manager of FIG. 1 for managing deployment of an update to a number of computing devices, including the detection of potential deployment issues.

With reference to FIG. 4, one embodiment of a routine 400 implemented by a device, such as the update deployment manager 102 of FIG. 1, for deploying an update to computing devices will be described. Specifically, at block 402, an update deployment manager 102 may receive a set of criteria for deployment of an update to a number of computing devices, such as computing devices 130 of FIG. 1. Deployment criteria may include, by way of non-limiting example, a set of computing devices on which to deploy an update, a set of monitored computing devices 130 to monitor for potential effects of deployment of the update, a set of performance metrics by which to monitor the monitored computing devices, and a set of monitoring criteria by which to detect deployment issues based on the monitoring information received from monitoring computing devices. As described above, in some embodiments, monitoring criteria may include thresholds for values of monitored information, as well as actions taken in response to meeting a threshold. For example, monitoring criteria may specify that if a given performance metric increases or decreases by a given amount (e.g., X %, Y amount, etc.), deployment of the update should increase in rate by a given amount. Monitoring criteria may include any combination of such thresholds. In some embodiments, monitoring criteria may include a vitality test by which to determine the existence of a deployment issue. In some embodiments, deployment criteria may include a deployment schedule specifying an order for deployment of an update, or criteria for selection of such an order. For example, a deployment schedule may specify that an update should be deployed to all computing devices in a given region prior to computing devices in a second region. Moreover, a deployment schedule may specify a rate of deployment of an update (e.g., a linear deployment rate, an exponential deployment rate, etc.).

Thereafter, at block 404, the update deployment manager 102 may determine base monitoring information for a number of monitored computing devices. In some embodiments, the monitored computing devices may correspond to each computing device to receive an update. In other embodiments, the monitored computing devices may include other computing devices, such as computing devices which are reliant on the computing devices to receive an update. For example, monitored computing devices may include web servers or other "front end" computing devices, where an update to a "back end" system (e.g., a database) is to be deployed. As such, deployment of an update may be controlled based on its effect on other computing devices, such as those hosted end user services. In still more embodiments, monitored computing devices may include both computing devices to receive an update as well as computing devices which are not intended to receive an update.

Illustratively, base monitoring information may be determined by monitoring the set of monitored computing devices (e.g., as specified in the received deployment criteria) for an amount of time prior to deployment of the update. Illustratively, such monitoring may enable the update deployment manager 102 to determine a change in a performance metric prior to, during and after deployment of an update. In other embodiments, base information may be determined by receiving historical data regarding performance metrics (e.g., from the set of monitored computing devices, from other similar computing devices, etc.). In still more embodiments, base monitoring information may be received via manual input (e.g., from an operator of the update deployment manager 102) or determined automatically. Automatic determination of base monitoring information may include, for example, estimating performance metrics of a computing device based on the configuration (e.g., hardware, software or specific configuration thereof) of the computing device. Moreover, in some embodiments, monitoring criteria may not be dependent on base monitoring information. For example, monitoring criteria may include absolute thresholds (e.g., CPU use over 50%, more than 20% dropped packets, etc.). As such, base monitoring information may not be required, and may therefore be omitted.

At block 408, the update deployment manager 102 may deploy the update to an initial set of computing devices for implementation. Thereafter, at block 410 and either during implementation of the update on the initial set of computing devices or subsequent to such implementation, the update deployment manager 102 may receive monitoring information from the monitored set of computing devices. Monitoring information may include information related to any number of performance metrics. Performance metrics are described in more detail above with reference to FIG. 1, but may include, by way of non-limiting example, response time (e.g., latency), response success or failure rate (e.g., dropped packets, ping failures, reported error rate, etc.), computing resource utilization (CPU use, RAM use, network bandwidth use, etc.), or other specialized metrics, such as those specified in SLAs for a given computing device.

At block 412, the update deployment manager 102 may determine, based on the received monitoring information as well as on the monitoring criteria, whether a deployment issue has occurred during or after deployment of the update. Specifically, the update deployment manager 102 may analyze the received monitoring information to determine whether any performance metrics indicate a deployment issue. As described above, in some embodiments, a deployment issue may be determined when performance metrics satisfy predefined thresholds. These thresholds may be absolute (e.g., greater than X % CPU usage) or relative to the base monitoring information (e.g., an increase of X % over the base CPU usage). In some embodiments, the update deployment manager 102 may utilize one or more vitality tests to determine whether a deployment issue exists.

If a deployment issue is detected, the routine 400 continues at block 414, where a diagnostic subroutine may be implemented to diagnose the deployment issue. One illustrative example of such a diagnostic subroutine will be described in more detail with respect to FIG. 5, below. In some embodiments, the routine 400 may employ any of a number of heuristic algorithms during diagnosis of the deployment issue. Common heuristic algorithms are well known within the art, and therefore will not be discussed in more detail herein. In some embodiments, implementation of the routine 400 may pause until completion of the diagnostic subroutine. In other embodiments, implementation of the diagnostic subroutine at block 414 may trigger the diagnostic subroutine, but not cause the routine 400 to pause. In this manner, both the diagnostic subroutine and the routine 400 may proceed concurrently. Such concurrent execution may be beneficial in instances where rapid deployment is desired. Specifically, because the ease of diagnosis may be dependent on the number of deployment issues detected and the total number of deployments, continued execution of the routine 400 may facilitate more rapid diagnosis. However, continued execution of the routine 400 may also increase the likelihood of experiencing deployment issues.

After triggering implementation of the diagnostic subroutine, the routine 400 may continue at block 415, where future deployment of the update may be modified. For example, in some embodiments, future deployments may be modified based on the results of the diagnostic subroutine. Illustratively, in one embodiment, the update deployment manager 102 may modify a deployment schedule to prevent deployment of the update to computing devices which are likely to incur deployment issues. By removing such computing devices, the likelihood of future deployment issues occurring may be decreased. In other embodiments, future deployment may be modified based on detection of a deployment issue. For example, a deployment issue may be detected at block 412 which indicates an issue with CPU usage of devices implementing an update. Accordingly, the update deployment manager may modify future deployments in order to more closely monitor CPU usage, to monitor other performance metrics related to CPU usage, or to halt or lessen monitoring of other performance metrics unrelated to CPU usage. In this manner, monitored performance metrics may be altered to conform to deployment issues that are expected to occur. After modification of the deployment schedule, the routine may return to block 408 and continue until block 412, where any additional deployment issues may again be detected.

If, at block 412, no deployment issues are detected, the routine 400 may continue at block 416, where the update deployment manager 102 may determine whether a set of completion criteria is satisfied. Completion criteria may be included, for example, in the previously received deployment criteria. Further, in some embodiments, completion criteria may be automatically determined by the update deployment manager 102, or may be manually specified. For example, completion criteria may allow the routine 400 to complete where each of the set of computing devices to receive an update have implemented the update. Further, completion criteria may allow the routine 400 to complete where a diagnostic subroutine has indicated that a deployment issue exists that cannot be diagnosed. In these embodiments, the update deployment manager 102 may be configured to send an error to, for example, the operator of the update deployment manager 102 to notify the operator that such a failure occurred. If the set of completion criteria is not satisfied, the routine may continue at block 408, as described above. If the set of completion criteria are satisfied, the routine may end at block 418.

Figure 5:
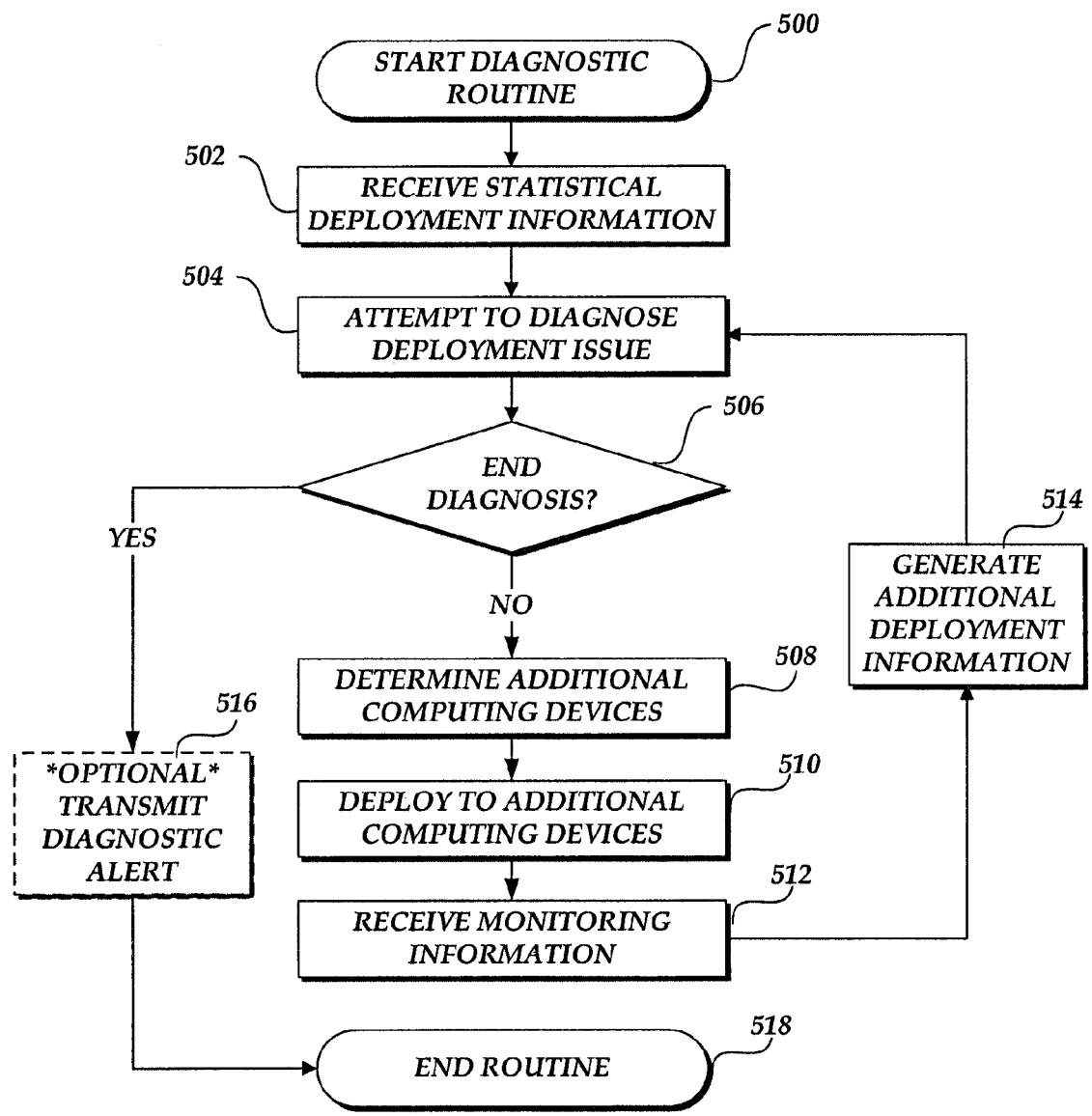
FIG. 5 is a flow diagram depicting an illustrative routine implemented by an update deployment manager of FIG. 1 for diagnosing potential causes of a detected deployment issue, and modifying a deployment schedule based on a diagnosis.

With reference to FIG. 5, one embodiment of a routine 500 implemented by a device, such as the update deployment manager 102 of FIG. 1, for diagnosing a detected deployment issue will be described. Illustratively, the update deployment manager 102 may implement the routine via a diagnostic module, such as diagnostic module 104 of FIG. 1, discussed above. In some embodiments, the routine 500 may be implemented independently. In other embodiments, the routine 500 may be implemented as a subroutine, such as by block 414 of FIG. 4, described above.

The routine 500 may begin at block 502, where statistical information regarding the deployment of an update incurring a deployment issue is received. Statistical deployment information may include, for example, whether one or more computing devices experienced a deployment issue, details regarding the deployment issue experienced, and information regarding the characteristics of the computing devices to which the update was transmitted (e.g., a configuration or location of the computing devices, etc.). For example, the statistical deployment information may correspond to the information within table 300 of FIG. 3.

At block 504, the update deployment manager 102 may attempt to diagnose the deployment issue given the received statistical deployment information. Diagnosis of deployment issues is described above in more detail with respect to FIG. 3. However, in brief, the update deployment manager 102 may attempt to determine a statistical likelihood that one or more characteristics of a computing device are correlated to the deployment issue. In one embodiment, the update deployment manager 102 may determine a total confidence that the characteristic is correlated to the deployment issue, which may include determining an initial correlation confidence as well as a false correlation confidence. As noted above, an initial correlation confidence may correspond to the correlation between a given characteristic and computing devices experiencing a deployment issue; while the false correlation confidence may correspond to a correlation between the given characteristic and computing devices not experiencing a deployment issue. Any or all of the total correlation confidence, the initial correlation confidence, or the false correlation confidence may be modified based on statistical analysis algorithms, such as determination of a margin of error. In other embodiments, additional or alternative statistical algorithms may be utilized to determine a correlation between one or more characteristics and a deployment issue.

At block 506, the update deployment manager 102 may determine whether to end diagnosis. In some embodiments, such a determination may be based on one or more diagnosis completion criteria. For example, diagnosis completion criteria may specify threshold confidence levels associated with a diagnosis. Illustratively, diagnosis completion criteria may be satisfied when a deployment issue is determined to be correlated to at least one characteristic by at least a 95% confidence. Diagnosis completion criteria may further include criteria for specifying a diagnosis failure. For example, diagnosis completion criteria may specify a maximum runtime of the diagnostic routine 500, a maximum number of implementations of block 504 of the routine 500 (e.g., a maximum attempted diagnoses), a maximum number or percentage of devices to which an update has been deployed without diagnosis, a maximum number or percentage of devices on which a deployment issue has been detected, or any combination of the above.

If the update deployment manager 102 determines not to end diagnosis (e.g., because a diagnosis has not been determined and other failure criteria are not satisfied), the routine 500 may continue at block 508. Specifically, at block 508, the update deployment manager 102 may determine a number of additional computing devices on which to deploy the update. As noted above, deployment of an update to additional computing devices may enable diagnosis of a deployment issue, or facilitate confirmation of an initial diagnosis. Additional computing devices to which to deploy an update may be determined according to a number of criteria, such as an existing deployment schedule, a potential for occurrence of a deployment issue, or a risk associated with such an occurrence. For example, where an initial diagnosis (e.g., made at block 504) indicates a potential correlation between a given characteristic and a deployment issue, the update deployment manager 102 may target computing devices with the given characteristic for future deployment. Such targeting may enable the update deployment manager 102 to confirm its initial diagnosis by increasing the confidence of a correlation between the characteristic and the deployment issue.

After determination of additional computing devices to which to deploy an update, the update may be deployed to the additional computing devices at block 510, as described above with respect to FIGS. 2A and 2B. At block 512, which may occur subsequent to or during such deployment, additional monitoring information may be received from the additional computing devices (or from other monitored computing devices). Thereafter, at block 514, the update deployment manager 102 may analyze the received monitoring information in order to generate additional statistical deployment information. Illustratively, the update deployment manager 102 may determine whether any additional computing devices experienced deployment issues, as well as characteristics of those computing devices. This additional statistical deployment information may be combined with the previously determined statistical deployment information. The routine 500 may then continue at block 504, where diagnosis of the deployment issue is again attempted. The routine 500 may then continue as described above until a determination is made to end diagnosis (e.g., by satisfaction of diagnosis completion criteria).

After a determination to end diagnosis is made, the routine 500 may optionally continue at block 516, where a diagnostic alert or notification may be transmitted to an operator or administrator of the update deployment device 102. Such an alert may include information regarding the deployment issue as well as the diagnosis of the deployment issue. For example, the alert may include the number of devices experiencing the issue, the diagnosis of the issue, as well as the confidence that the issue was correctly diagnosed. As noted above, in some embodiments, deployment schedules may be modified in order to avoid implementing an update on machines likely to experience the deployment issue. In these embodiments, the alert may further include information regarding modifications to a deployment schedule or other actions taken to minimize the likelihood of further deployment issues.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing update deployment, the method comprising:
    obtaining a software update to be deployed on a plurality of computing devices according to a deployment schedule, and a set of criteria for determination of deployment issues in response to deployment of the software update;
    causing the deployment of the software update to a first set of computing devices of the plurality of computing devices;
    determining, based on the set of criteria, a likelihood of a deployment issue on at least one computing device of the first set of computing devices, wherein a deployment issue corresponds to at least one of (i) a failure to implement the software update by the at least one computing device and (ii) a decline in a performance metric associated with the at least one computing device;
    in response to an attempted determination of a correlation between the determined deployment issue and a set of characteristics of the at least one computing device, deploying the software update to a second set of computing devices of the plurality of computing devices;
    detecting a correlation between the determined deployment issue and the set of characteristics of the at least one computing device based at least in part on characteristic information of the first and second sets of computing devices; and
    modifying the deployment schedule to exclude one or more computing devices of the plurality of computing devices that conform to the set of characteristics.

2. The computer-implemented method of claim 1, wherein the software update comprises at least one of an application, an operating system, a driver, a module, a script, and a configuration.

3. The computer-implemented method of claim 1, wherein the set of characteristics of the at least one computing device comprises at least one of a configuration of the at least one computing device, statistical information corresponding to the at least one computing device, a location of the at least one computing device, environmental information regarding the at least one computing device, or a classification of the at least one computing device.

4. The computer-implemented method of claim 1, wherein detecting a correlation between the determined deployment issue and the set of characteristics of the at least one computing device is based at least in part on characteristics of each of the first set of computing devices.

5. The computer-implemented method of claim 1, wherein detecting a correlation between the determined deployment issue and the set of characteristics of the at least one computing device is based at least in part on characteristics of the second set of computing devices.

6. The computer-implemented method of claim 1, wherein the second set of computing devices is determined based at least in part on the set of characteristics.

7. A system for managing update deployment, the system comprising:
    one or more processors configured to:
        obtain a software update to be deployed on a plurality of computing devices according to a deployment schedule, and a set of criteria for detection of deployment issues in response to deployment of the software update, wherein deployment of the software update on individual computing devices is associated with a target result;
        cause deployment of the software update to a set of computing devices of the plurality of computing devices;
        determine, based on the set of criteria, a deployment issue on at least one computing device of the set of computing devices, wherein a deployment issue corresponds to failing to achieve the target result on the at least one computing device;
        detect a correlation between the determined deployment issue and a set of characteristics of the at least one computing device based at least in part on characteristic information of the set of computing devices; and
        modify the deployment schedule to exclude one or more computing devices of the plurality of computing devices that conform to the set of characteristics.

8. The system of claim 7, wherein the one or more processors are configured to determine a deployment issue based at least in part on a determination that the performance metric has fallen below a predetermined threshold.

9. The system of claim 7, wherein the one or more processors are configured to detect a correlation between the determined deployment issue and one or more characteristics of the at least one computing device based at least in part on characteristics of each of the set of computing devices.

10. The system of claim 7, wherein the correlation is detected according to a heuristic algorithm.

11. The system of claim 7, wherein the correlation is detected at a statistical confidence level exceeding a predetermined threshold.

12. The system of claim 7, wherein the one or more processors are further configured to:
   attempt to detect a correlation between the determined deployment issue and the set of characteristics of the at least one computing device;
   determine that additional information is required to detect the correlation; and
   deploy the software update to a second set of computing devices of the plurality of computing devices,
   wherein the one or more processors are further configured to detect a correlation between the determined deployment issue and set of characteristics of the at least one computing device based at least in part on characteristics of the second set of computing devices.

13. The system of claim 7, wherein the one or more processors are further configured to transmit a notification that a deployment issue has been detected.

14. The system of claim 13, wherein the notification indicates that a correlation between the determined deployment issue and the one or more characteristics has been determined.

15. A non-transitory computer readable medium comprising computer-executable modules for managing update deployment, the modules comprising:
   a deployment module that, when executed by a processor, causes the processor to:
      cause deployment of a software update to a first set of computing devices within a plurality of computing devices intended to receive the software update;
      determine a deployment issue on at least one computing device of the set of computing devices;
      detect a correlation between the determined deployment issue and a set of characteristics of the at least one computing device based at least in part on characteristic information of the set of computing devices; and
      modify future deployment of the software update to exclude one or more computing devices of the plurality of computing devices that conform to the set of characteristics.

16. The non-transitory computer readable medium of claim 15, wherein the performance metric comprises at least one of response time, response failures, dropped packets, ping failures, error rate, network bandwidth, central processing unit use, random access memory use, or power consumption.

17. The non-transitory computer readable medium of claim 15, wherein the set of performance metrics are determined based at least in part on a service level agreement associated with a service provided by a computing device.

18. The non-transitory computer readable medium of claim 15, wherein the deployment module, when executed by a processor, causes the processor to detect the correlation between the determined deployment issue and the set of characteristics based at least in part on characteristics of the set of computing devices.

19. The non-transitory computer readable medium of claim 15, wherein the correlation is detected at a statistical confidence level exceeding a predetermined threshold.

20. The non-transitory computer readable medium of claim 15, wherein the deployment module, when executed by a processor, further causes the processor to:
   attempt to detect a correlation between the determined deployment issue and the set of characteristics of the at least one computing device;
   determine that additional information is required to detect the correlation; and
   deploy the software update to a second set of computing devices of the plurality of computing devices.

21. The non-transitory computer readable medium of claim 19, wherein the second set of computing devices comprises a virtual computing device, and wherein the deployment module, when executed by a processor, further causes the processor to instantiate the virtual computing device.

22. A computer-implemented method for managing update deployment, the method comprising:
   obtaining a software update to be deployed on a plurality of computing devices;
   deploying the software update to a set of computing devices of the plurality of computing devices;
   determining a deployment issue on at least one computing device of the set of computing devices;
   detecting a correlation between the determined deployment issue and a set of characteristics of the at least one computing device based at least in part on characteristic information of the set of computing devices; and
   modifying further deployment of the software update to exclude one or more computing devices of the plurality of computing devices that conform to the set of characteristics.

23. The method claim 22, wherein detecting a correlation between the determined deployment issue and the set of characteristics is based at least in part on characteristics of the set of computing devices.

24. The method claim 22 further comprising:
   attempting to detect a correlation between the determined deployment issue and the set of characteristics of the at least one computing device;
   determining that additional information is required to detect the correlation; and
   deploying the software update to a second set of computing devices of the plurality of computing devices.

25. The method claim 23, wherein detecting a correlation between the determined deployment issue and the set of characteristics is based at least in part on characteristics of the second set of computing devices.

* * * * *

UNITED STATES PATENT AND TRADEMARK OFFICE
CERTIFICATE OF CORRECTION

PATENT NO.         : 9,229,902 B1
APPLICATION NO.    : 13/767714
DATED              : January 5, 2016
INVENTOR(S)        : Benjamin Alan Leis et al.

It is certified that error appears in the above-identified patent and that said Letters Patent is hereby corrected as shown below:

In the claims

In column 22 at line 40 (approx.), In Claim 23, after "method" insert --of--.

In column 22 at line 44 (approx.), In Claim 24, after "method" insert --of--.

In column 22 at line 52 (approx.), In Claim 25, after "method" insert --of--.

Signed and Sealed this
Fifth Day of July, 2016

Michelle K. Lee
*Director of the United States Patent and Trademark Office*